United States Patent
Maeda et al.

(10) Patent No.: US 9,296,950 B2
(45) Date of Patent: *Mar. 29, 2016

(54) LIQUID CRYSTAL COMPOSITION AND LIQUID CRYSTAL DISPLAY DEVICE

(75) Inventors: Taketo Maeda, Chiba (JP); Yoshimasa Furusato, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/990,796

(22) PCT Filed: Dec. 9, 2011

(86) PCT No.: PCT/JP2011/078548
§ 371 (c)(1),
(2), (4) Date: May 31, 2013

(87) PCT Pub. No.: WO2012/081516
PCT Pub. Date: Jun. 21, 2012

(65) Prior Publication Data
US 2013/0278851 A1 Oct. 24, 2013

(30) Foreign Application Priority Data

Dec. 14, 2010 (JP) ................................. 2010-278154

(51) Int. Cl.
*C09K 19/42* (2006.01)
*C09K 19/30* (2006.01)
*C09K 19/20* (2006.01)
C09K 19/04 (2006.01)

(52) U.S. Cl.
CPC ............. *C09K 19/3003* (2013.01); *C09K 19/20* (2013.01); *C09K 19/3066* (2013.01); *C09K 19/42* (2013.01); C09K 2019/0466 (2013.01); C09K 2019/3004 (2013.01)

(58) Field of Classification Search
CPC .... C09K 19/12; C09K 19/20; C09K 13/2007; C09K 19/3003; C09K 19/3066; C09K 2019/123; C07C 25/18; C07C 43/225; G03F 2001/133565
USPC ....................................................... 252/299.6
See application file for complete search history.

(56) References Cited

U.S. PATENT DOCUMENTS

| 2003/0134056 A1 | 7/2003 | Heckmeier et al. |
| 2009/0101869 A1 | 4/2009 | Czanta et al. |
| 2012/0044453 A1* | 2/2012 | Miyairi et al. ................ 349/182 |
| 2012/0261616 A1 | 10/2012 | Czanta et al. |

FOREIGN PATENT DOCUMENTS

| JP | 2002-327175 | 11/2002 |
| JP | 2002-338518 | 11/2002 |
| JP | 2003518154 | 3/2003 |
| JP | 2004-210855 | 7/2004 |
| JP | 2008-156642 | 7/2008 |
| TW | 201042015 | 12/2010 |
| WO | 2010131614 | 11/2010 |
| WO | WO 2010131614 A1 * | 11/2010 |
| WO | 2011082742 | 7/2011 |

OTHER PUBLICATIONS

"International Search Report (Form PCT/ISA/210)", mailed on Jan. 17, 2012, with English translation thereof, p. 1-p. 4, in which the listed references (WO2010131614, JP2002-327175,JP2002-338518 and WO2011082742) were cited.
"Office Action of Taiwan Counterpart Application", issued on Jun. 9, 2015, with English translation thereof, pp. 1-11.
"Office Action of Taiwanese Counterpart Application", issued on Oct. 2, 2015, with English translation thereof, pp. 1-6, in which the listed reference was cited.

* cited by examiner

Primary Examiner — Chanceity Robinson
(74) Attorney, Agent, or Firm — Jianq Chyun IP Office

(57) ABSTRACT

A liquid crystal composition has a nematic phase, and contains a specific tricyclic compound having a large dielectric anisotropy as a first component and a specific bicyclic compound having a small viscosity as a second component, and may contain a specific compound having a high maximum temperature or a large dielectric anisotropy as a third component, and a specific compound having a high maximum temperature or a small viscosity as a fourth component, and a liquid crystal display device includes the composition.

9 Claims, No Drawings

LIQUID CRYSTAL COMPOSITION AND LIQUID CRYSTAL DISPLAY DEVICE

CROSS-REFERENCE TO RELATED APPLICATION

This application is a 371 application of an international PCT application serial no. PCT/JP2011/078548, filed on Dec. 9, 2011, which claims the priority benefit of Japan application no. 2010-278154, filed on Dec. 14, 2010. The entirety of each of the above-mentioned patent applications is hereby incorporated by reference herein and made a part of this specification.

TECHNICAL FIELD

The invention relates to a liquid crystal composition mainly suitable for use in an active matrix (AM) device and so forth, and an AM device and so forth including the composition. In particular, the invention relates to a liquid crystal composition having a positive dielectric anisotropy, and a device that includes the composition and has a mode such as a twisted nematic (TN) mode, an optically compensated bend (OCB) mode, an in-plane switching (IPS) mode, a fringe field switching (FFS) mode or a polymer sustained alignment (PSA) mode, and so forth.

BACKGROUND ART

In a liquid crystal display device, a classification based on an operating mode for liquid crystals includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a polymer sustained alignment (PSA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type according to a production process. A classification based on a light source includes a reflective type utilizing natural light, a transmissive type utilizing backlight and a transflective type utilizing both the natural light and the backlight.

The devices include a liquid crystal composition having suitable characteristics. The liquid crystal composition has a nematic phase. General characteristics of the composition should be improved to obtain an AM device having good general characteristics. Table 1 below summarizes a relationship of the general characteristics between two aspects. The general characteristics of the composition will be further explained based on a commercially available AM device. A temperature range of the nematic phase relates to a temperature range in which the device can be used. A preferred maximum temperature of the nematic phase is about 70° C. or higher and a preferred minimum temperature of the nematic phase is about −10° C. or lower. Viscosity of the composition relates to a response time in the device. A short response time is preferred for displaying moving images on the device. Accordingly, a small viscosity in the composition is preferred. A small viscosity at a low temperature is further preferred.

TABLE 1

General Characteristics of Composition and AM Device

| No. | General Characteristics of Composition | General Characteristics of AM Device |
|---|---|---|
| 1 | Wide temperature range of a nematic phase | Wide usable temperature range |
| 2 | Small viscosity[1] | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |

[1] A liquid crystal composition can be injected into a liquid crystal cell in a shorter period of time.

An optical anisotropy of the composition relates to a contrast ratio in the device. A product ($\Delta n \times d$) of the optical anisotropy ($\Delta n$) of the composition and a cell gap (d) in the device is designed so as to maximize the contrast ratio. A suitable value of the product depends on the type of the operating mode. The suitable value is about 0.45 micrometer in a device having the mode such as a TN mode. In the above case, a composition having a large optical anisotropy is preferred for a device having a small cell gap. A large dielectric anisotropy in the composition contributes to a low threshold voltage, a small electric power consumption and a large contrast ratio in the device. Accordingly, the large dielectric anisotropy is preferred. A large specific resistance in the composition contributes to a large voltage holding ratio and a large contrast ratio in the device. Accordingly, a composition having a large specific resistance at room temperature and also at a temperature close to the maximum temperature of the nematic phase in an initial stage is preferred. A composition having a large specific resistance at room temperature and also at a temperature close to the maximum temperature of the nematic phase even after the device has been used for a long period of time is preferred. Stability of the composition to ultraviolet light and heat relates to a service life of the liquid crystal display device. In the case where the stability is high, the device has a long service life. Such characteristics are preferred for an AM device for use in a liquid crystal projector, a liquid crystal television and so forth.

A composition having a positive dielectric anisotropy is used for an AM device having the TN mode. On the other hand, a composition having a negative dielectric anisotropy is used for an AM device having the VA mode. A composition having a positive or negative dielectric anisotropy is used for an AM device having the IPS mode or the FFS mode. A composition having a positive or negative dielectric anisotropy is used for an AM device having the PSA mode. Examples of the liquid crystal composition having the positive dielectric anisotropy are disclosed in Patent literature Nos. 1 to 4.

CITATION LIST

Patent Literature

Patent literature No. 1: JP 2004-210855 A.
Patent literature No. 2: JP 2002-327175 A.
Patent literature No. 3: JP 2003-518154 A.
Patent literature No. 4: JP 2008-156642 A.

A desirable AM device has characteristics such as a wide temperature range in which a device can be used, a short response time, a large contrast ratio, a low threshold voltage, a large voltage holding ratio and a long service life. A shorter response time even by one millisecond is desirable. Thus, desirable characteristics of a composition include a high maximum temperature of a nematic phase, a low minimum temperature of the nematic phase, a small viscosity, a suitable optical anisotropy, a large dielectric anisotropy, a large specific resistance, a high stability to ultraviolet light and a high stability to heat.

SUMMARY OF INVENTION

Technical Problem

One of the aims of the invention is to provide a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a high stability to ultraviolet light and a high stability to heat. Another aim is to provide a liquid crystal composition having a suitable balance regarding at least two of the characteristics. A further aim is to provide a liquid crystal display device including such a composition. An additional aim is to provide a composition having characteristics such as a suitable optical anisotropy, a large dielectric anisotropy and a high stability to ultraviolet light, and is to provide an AM device having a short response time, a large voltage holding ratio, a large contrast ratio, a long service life and so forth.

Solution to Problem

The invention concerns a liquid crystal composition that has a nematic phase, and contains at least one compound selected from the group of compounds represented by formula (1) as a first component and at least one compound selected from the group of compounds represented by formula (2) as a second component, and a liquid crystal display device including the composition:

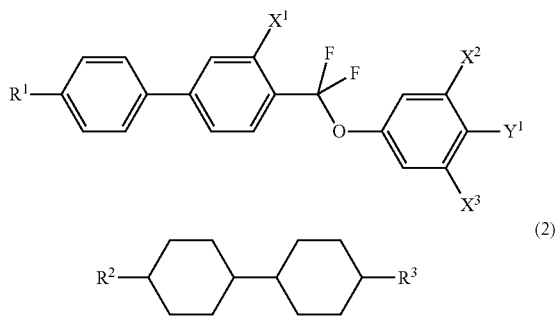

wherein, $R^1$ is independently alkyl having 1 to 12 carbons or alkenyl having 2 to 12 carbons, $R^2$ and $R^3$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $X^1$, $X^2$ and $X^3$ are independently hydrogen or fluorine; and $Y^1$ is fluorine, chlorine or trifluoromethoxy.

Advantageous Effects of Invention

An advantage of the invention is a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a high stability to ultraviolet light, and a high stability to heat. One aspect of the invention is a liquid crystal composition having a suitable balance regarding at least two of the characteristics. Another aspect is a liquid crystal display device including such a composition. A further aspect is a composition having a suitable optical anisotropy, a large dielectric anisotropy, a high stability to ultraviolet light and so forth, and an AM device having a short response time, a large voltage holding ratio, a large contrast ratio, a long service life and so forth.

DESCRIPTION OF EMBODIMENTS

Usage of terms herein is as described below. A liquid crystal composition or a liquid crystal display device according to the invention may be occasionally abbreviated as "composition" or "device," respectively. The liquid crystal display device is a generic term for a liquid crystal display panel and a liquid crystal display module. "Liquid crystal compound" means a compound having a liquid crystal phase such as a nematic phase or a smectic phase, or a compound having no liquid crystal phase but being useful as a component of the composition. Such a useful compound has a six-membered ring such as 1,4-cyclohexylene and 1,4-phenylene, and a rod-like molecular structure. An optically active compound or a polymerizable compound may be occasionally added to the composition. Even in the case where the compounds are liquid crystalline, the compounds are classified as an additive herein. At least one compound selected from the group of compounds represented by formula (1) may be occasionally abbreviated as "compound (1)." "Compound (1)" means one compound or two or more compounds represented by formula (1). A same rule applies to any other compound represented by any other formula. A term "arbitrary" shows that not only positions but also the number may be selected without limitation.

A maximum temperature of the nematic phase may be abbreviated as "maximum temperature." A minimum temperature of the nematic phase may be abbreviated as "minimum temperature." An expression "having a large specific resistance" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after the device has been used for a long period of time. An expression "having a large voltage holding ratio" means that the device has a large voltage holding ratio at room temperature and also at a temperature close to the maximum temperature of the nematic phase in an initial stage, and that the device has a large voltage holding ratio at room temperature and also at a temperature close to the maximum temperature of the nematic phase even after the device has been used for a long period of time. When characteristics such as optical anisotropy are explained, values obtained according to the measuring methods described in Examples will be used. A first component includes one compound or two or more compounds. "Ratio of the first component" is expressed in terms of weight percent (% by weight) of the first component based on the total weight of the liquid crystal composition. A ratio of a second component or the like is also expressed in a similar manner. A ratio of the additive mixed with the composition is expressed in terms of weight percent (% by weight) or weight parts per million (ppm) based on the total weight of the liquid crystal composition.

A symbol $R^1$ is used for a plurality of compounds in chemical formulas of component compounds. In two of arbitrary compounds among the plurality of compounds, a group to be selected by $R^1$ may be identical or different. In one case, for example, $R^1$ of compound (1) is ethyl and $R^1$ of compound (1-1) is ethyl. In another case, $R^1$ of compound (1) is ethyl and $R^1$ of compound (1-1) is propyl. A same rule applies to a symbol $R^4$, $X^4$, $Y^2$ or the like.

The invention includes the items as described below.

Item 1. A liquid crystal composition that has a nematic phase, and contains at least one compound selected from the group of compounds represented by formula (1) as a first component and at least one compound selected from the group of compounds represented by formula (2) as a second component:

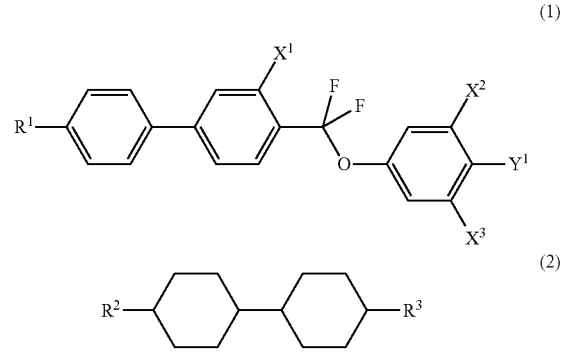

wherein, $R^1$ is alkyl having 1 to 12 carbons or alkenyl having 2 to 12 carbons, $R^2$ and $R^3$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $X^1$, $X^2$ and $X^3$ are independently hydrogen or fluorine; and $Y^1$ is fluorine, chlorine or trifluoromethoxy.

Item 2. The liquid crystal composition according to item 1, wherein the first component is at least one compound selected from the group of compounds represented by formula (1-1) and formula (1-2):

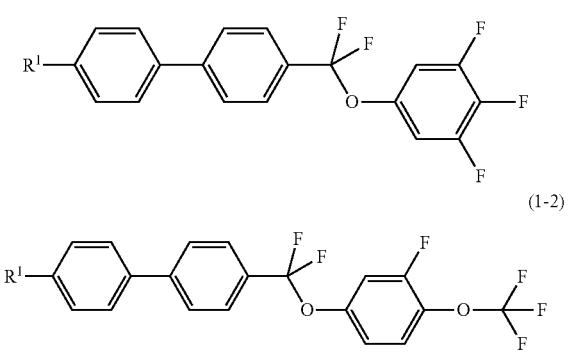

wherein, $R^1$ is alkyl having 1 to 12 carbons or alkenyl having 2 to 12 carbons.

Item 3. The liquid crystal composition according to item 1 or 2, wherein a ratio of the first component is in the range of 3% by weight to 30% by weight, and a ratio of the second component is in the range of 10% by weight to 80% by weight, based on the total weight of the liquid crystal composition.

Item 4. The liquid crystal composition according to any one of items 1 to 3, further containing at least one compound selected from the group of compounds represented by formula (3-1) to formula (3-5) as a third component:

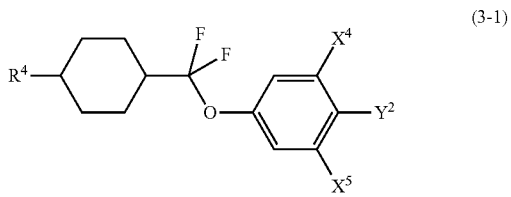

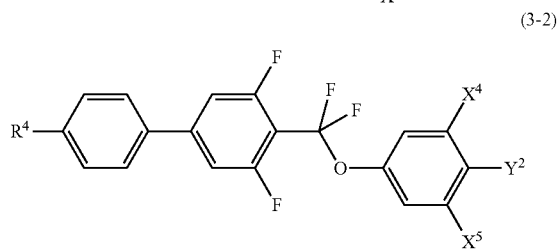

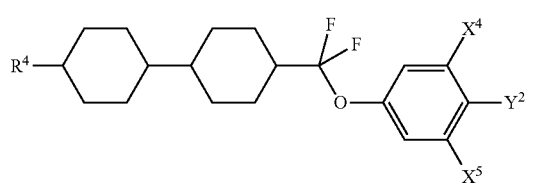

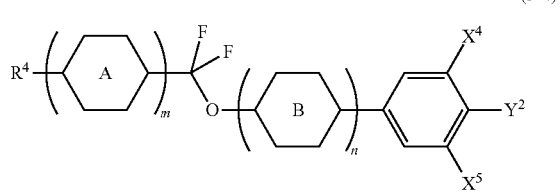

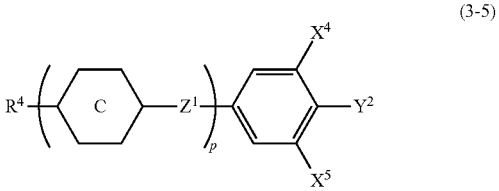

wherein, $R^4$ is alkyl having 1 to 12 carbons or alkenyl having 2 to 12 carbons; ring A, ring B and ring C are independently 1,4-cyclohexylene, 1,4-phenylene, 2-fluoro-1,4-phenylene, 3-fluoro-1,4-phenylene, 3,5-difluoro-1,4-phenylene, 1,3-dioxane-2,5-diyl or tetrahydropyran-2,5-diyl; $X^4$ and $X^5$ are independently hydrogen or fluorine; $Y^2$ is fluorine, chlorine or trifluoromethoxy; $Z^1$ is independently a single bond, ethylene or carbonyloxy; and m is 2 or 3, n is 0 or 1, a sum of m and n is 3, and p is 1, 2 or 3.

Item 5. The liquid crystal composition according to item 4, wherein the third component contains at least one compound selected from the group of compounds represented by formula (3-1-1), formula (3-2-1), formula (3-2-2), formula (3-3-1), formula (3-4-1) to formula (3-4-3), and formula (3-5-1) to formula (3-5-13):
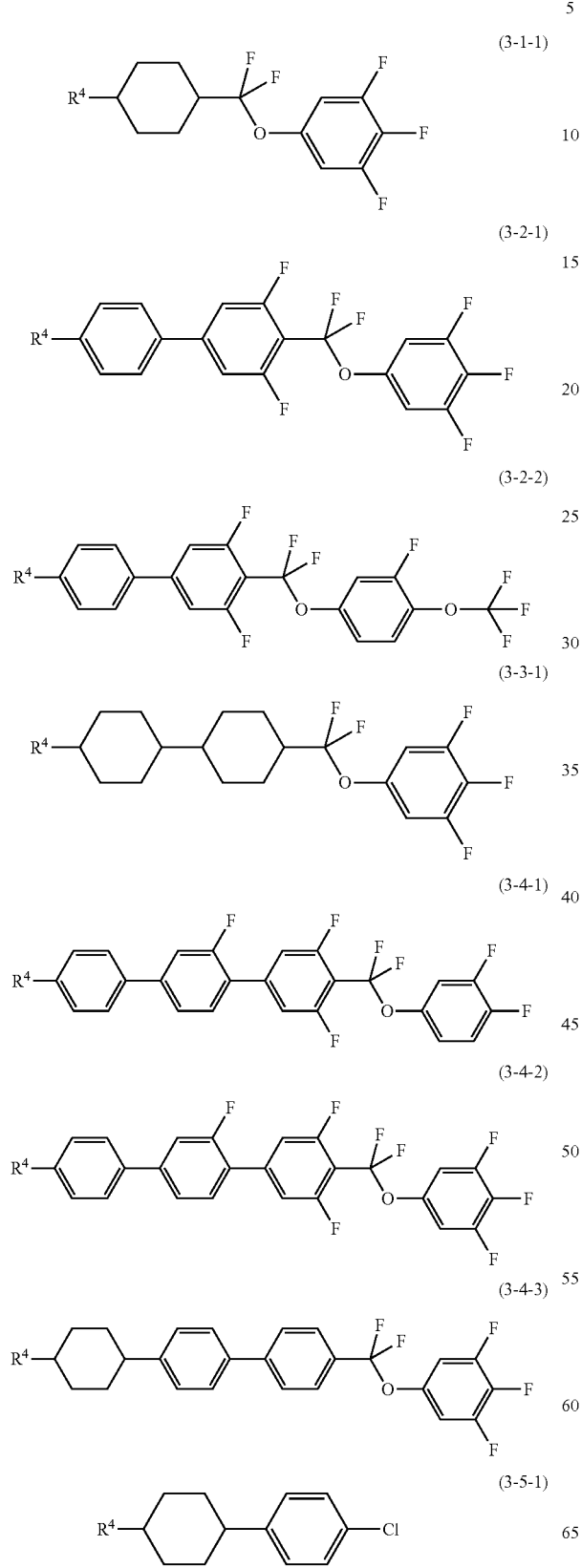
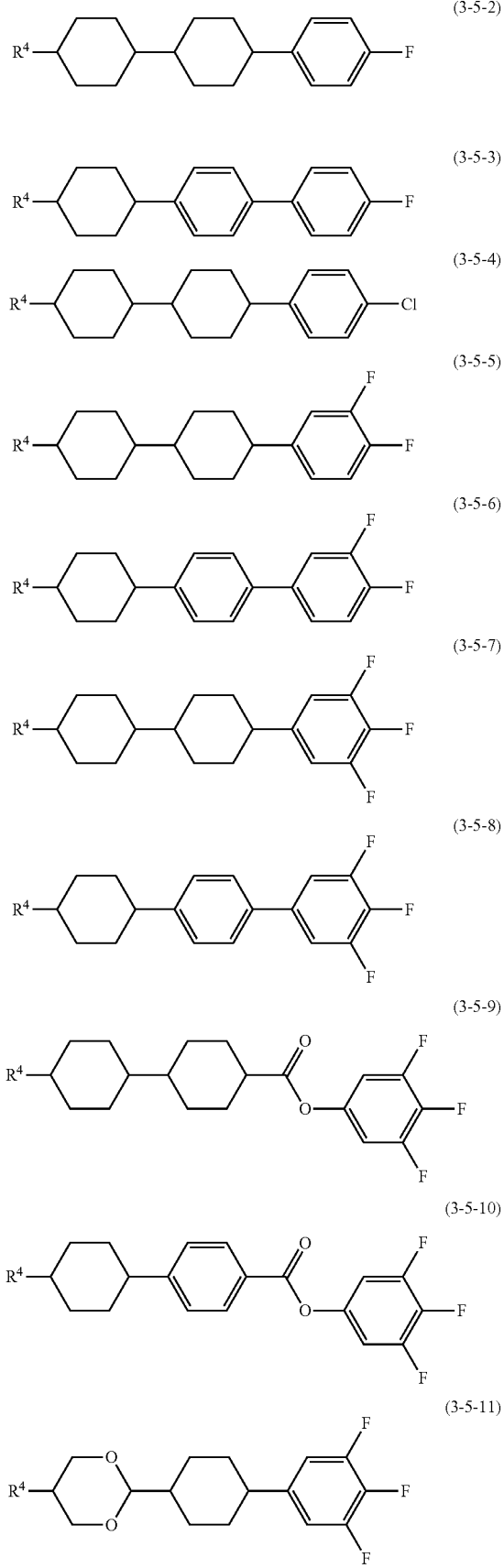

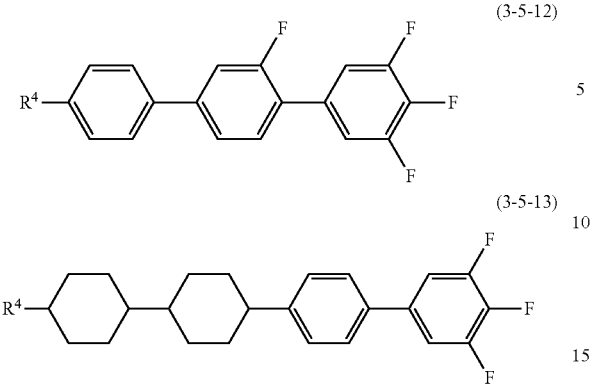

(3-5-12)

(3-5-13)

wherein, $R^4$ is independently alkyl having 1 to 12 carbons or alkenyl having 2 to 12 carbons.

Item 6. The liquid crystal composition according to item 5, wherein the third component contains at least one compound selected from the group of compounds represented by formula (3-2-1).

Item 7. The liquid crystal composition according to item 5, wherein the third component contains at least one compound selected from the group of compounds represented by formula (3-4-2).

Item 8. The liquid crystal composition according to item 5, wherein the third component contains at least one compound selected from the group of compounds represented by formula (3-4-3).

Item 9. The liquid crystal composition according to any one of items 4 to 8, wherein a ratio of the third component is in the range of 10% by weight to 80% by weight based on the total weight of the liquid crystal composition.

Item 10. The liquid crystal composition according to any one of items 1 to 9, further containing at least one compound selected from the group of compounds represented by formula (4-1) and formula (4-2) as a fourth component:

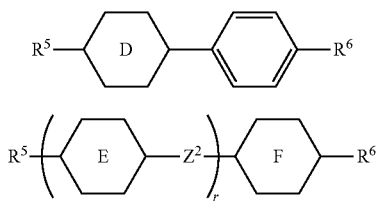

wherein, $R^5$ and $R^6$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring D, ring E and ring F are independently 1,4-cyclohexylene, 1,4-phenylene, 2-fluoro-1,4-phenylene or 3-fluoro-1,4-phenylene; $Z^2$ is independently a single bond, ethylene or carbonyloxy; and r is 2 or 3.

Item 11. The liquid crystal composition according to item 10, wherein the fourth component contains at least one compound selected from the group of compounds represented by formula (4-1-1), formula (4-1-2), and formula (4-2-1) to formula (4-2-9):

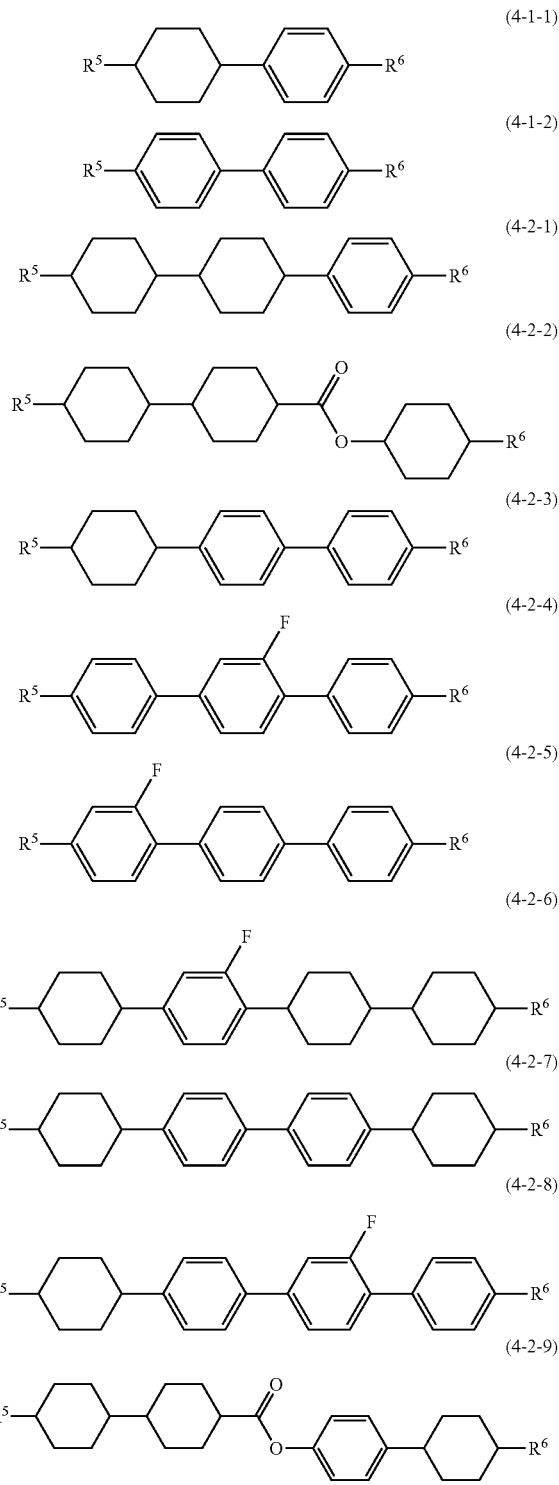

wherein, $R^5$ and $R^6$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 12. The liquid crystal composition according to item 11, wherein the fourth component contains at least one compound selected from the group of compounds represented by formula (4-2-1).

Item 13. The liquid crystal composition according to item 11, wherein the fourth component contains at least one compound selected from the group of compounds represented by formula (4-2-4).

Item 14. The liquid crystal composition according to any one of items 10 to 13, wherein a ratio of the fourth component is in the range of 5% by weight to 60% by weight based on the total weight of the liquid crystal composition.

Item 15. The liquid crystal composition according to any one of items 1 to 14, wherein a maximum temperature of a nematic phase is 70° C. or higher, an optical anisotropy (25° C.) at a wavelength of 589 nanometers is 0.07 or more, and a dielectric anisotropy (25° C.) at a frequency of 1 kHz is 2 or more.

Item 16. A liquid crystal display device including the liquid crystal composition according to any one of items 1 to 15.

Item 17. The liquid crystal display device according to item 16, wherein an operating mode of the liquid crystal display device is a TN mode, an ECB mode, an OCB mode, an IPS mode or a PSA mode, and a driving mode of the liquid crystal display device is an active matrix mode.

Item 18. Use of the liquid crystal composition according to any one of items 1 to 15 in a liquid crystal display device.

The invention further includes the following items: (1) the composition, further containing the optically active compound; (2) the composition, further containing the additive such as an antioxidant, an ultraviolet light absorber, an antifoaming agent, a polymerizable compound or a polymerization initiator; (3) an AM device including the composition; (4) a device including the composition, and having a TN, ECB, OCB, IPS, FFS or PSA mode; (5) a transmissive device including the composition; (6) use of the composition as the composition having the nematic phase; and (7) use as an optically active composition by adding the optically active compound to the composition.

The composition of the invention will be explained in the following order. First, a constitution of the component compounds in the composition will be explained. Second, main characteristics of the component compounds and main effects of the compounds on the composition will be explained. Third, a combination of components in the composition, a preferred ratio of the components and the basis thereof will be explained. Fourth, a preferred embodiment of the component compounds will be explained. Fifth, specific examples of the component compounds will be shown. Sixth, the additive that may be mixed with the composition will be explained. Seventh, methods for synthesizing the component compounds will be explained. Last, an application of the composition will be explained.

First, the constitution of the component compounds in the composition will be explained. The composition of the invention is classified into composition A and composition B. Composition A may further contain any other liquid crystal compound, the additive, an impurity or the like, in addition to the compound selected from compound (1), compound (2), compound (3-1) to compound (3-5), compound (4-1) and compound (4-2). "Any other liquid crystal compound" means a liquid crystal compound different from compound (1), compound (2), compound (3-1) to compound (3-5), compound (4-1) and compound (4-2). Such a compound is mixed with the composition for the purpose of further adjusting the characteristics. The additive includes the optically active compound, the antioxidant, the ultraviolet light absorber, a dye, the antifoaming agent, the polymerizable compound and the polymerization initiator. The impurity includes a compound mixed in a process such as preparation of the component compounds. Even in the case where the compound is liquid crystalline, the compound is classified as the impurity herein.

Composition B consists essentially of compounds selected from compound (1), compound (2), compound (3-1) to compound (3-5), compound (4-1) and compound (4-2). A term "essentially" means that the composition may contain the additive and the impurity, but does not contain any liquid crystal compound different from the compounds. Composition B has a smaller number of components than composition A has. Composition B is preferred to composition A in view of cost reduction. Composition A is preferred to composition B in view of possibility of further adjusting physical properties by mixing any other liquid crystal compound.

Second, the main characteristics of the component compounds and the main effects of the compounds on the characteristics of the composition will be explained. The main characteristics of the component compounds are summarized in Table 2 on the basis of advantageous effects of the invention. In Table 2, a symbol L stands for "large" or "high," a symbol M stands for "medium," and a symbol S stands for "small" or "low." The symbols L, M and S represent classification based on a qualitative comparison among the component compounds, and 0 (zero) means "a value is nearly zero."

TABLE 2

Characteristics of Compounds

| | Compounds | | | |
|---|---|---|---|---|
| | (1) | (2) | (3) | (4) |
| Maximum temperature | S | S | S to L | S to L |
| Viscosity | M | S | M to L | S to M |
| Optical anisotropy | M | S | S to L | S to L |
| Dielectric anisotropy | L | 0 | S to L | 0 |
| Specific resistance | L | L | L | L |

Upon mixing the component compounds with the composition, the main effects of the component compounds on the characteristics of the composition are as described below. Compound (1) significantly increases the dielectric anisotropy. Compound (2) decreases the minimum temperature and decreases the viscosity. Compound (3) increases the maximum temperature and increases the dielectric anisotropy. Compound (4) increases the maximum temperature and decreases the viscosity.

Third, the combination of components in the composition, the preferred ratio of the component compounds and the basis thereof will be explained. The combination of components in the composition includes a combination of the first component and the second component, a combination of the first component, the second component and the third component, a combination of the first component, the second component and the fourth component, a combination of the first component, the second component, the third component and the fourth component. A preferred combination of components in the composition includes the combination of the first component, the second component, the third component and the fourth component for increasing the dielectric anisotropy, decreasing the viscosity or decreasing the minimum temperature.

A preferred ratio of the first component is about 3% by weight or more for increasing the dielectric anisotropy, and about 30% by weight or less for decreasing the minimum temperature. A further preferred ratio is in the range of about 5% by weight to about 20% by weight. A particularly preferred ratio is in the range of about 5% by weight to about 15% by weight.

A preferred ratio of the second component is about 10% by weight or more for decreasing the viscosity, and about 80% by weight or less for decreasing the minimum temperature. A further preferred ratio is in the range of about 15% by weight to about 65% by weight. A particularly preferred ratio is in the range of about 15% by weight to about 50% by weight.

A preferred ratio of the third component is about 10% by weight or more for increasing the dielectric anisotropy, and about 80% by weight or less for decreasing the minimum temperature. A further preferred ratio is in the range of about 10% by weight to about 70% by weight. A particularly preferred ratio is in the range of about 15% by weight to about 70% by weight.

A preferred ratio of the fourth component is about 5% by weight or more for increasing the maximum temperature or decreasing the viscosity, and about 60% or less for decreasing the minimum temperature. A further preferred ratio is in the range of about 10% by weight to about 50% by weight. A particularly preferred ratio is in the range of about 10% by weight to about 40% by weight.

Fourth, the preferred embodiment of the component compounds will be explained. $R^1$ and $R^4$ are independently alkyl having 1 to 12 carbons or alkenyl having 2 to 12 carbons. Preferred $R^1$ or $R^4$ is alkyl having 1 to 7 carbons for increasing the stability to ultraviolet light or the stability to heat. $R^2$, $R^3$, $R^5$ and $R^6$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine. Preferred $R^2$, $R^3$, $R^5$ or $R^6$ is alkenyl having 2 to 5 carbons for decreasing the viscosity, and alkyl having 1 to 7 carbons for increasing the stability to ultraviolet light, or increasing the stability to heat.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on a position of a double bond. Trans is preferred in the alkenyl such as 1-propenyl, 1-butenyl, 1-pentenyl, 1-hexenyl, 3-pentenyl and 3-hexenyl for decreasing the viscosity. Cis is preferred in the alkenyl such as 2-butenyl, 2-pentenyl and 2-hexenyl. In the alkenyl, straight-chain alkenyl is preferred to branched-chain alkenyl.

Preferred examples of alkenyl in which arbitrary hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples include 2,2-difluorovinyl and 4,4-difluoro-3-butenyl for decreasing the viscosity.

Alkyl, alkoxy or alkenyl has a straight-chain shape or a branched shape, and does not include a cyclic shape. Moreover, a straight-chain shape is preferred to a branched shape.

Ring A, ring B and ring C are independently 1,4-cyclohexylene, 1,4-phenylene, 2-fluoro-1,4-phenylene, 3-fluoro-1,4-phenylene, 3,5-difluoro-1,4-phenylene, 1,3-dioxane-2,5-diyl or tetrahydropyran-2,5-diyl, two of arbitrary ring A when m is 2 or 3 may be identical or different, and two of arbitrary ring C when p is 2 or 3 may be identical or different. Preferred ring A, ring B or ring C is 1,4-phenylene or 3-fluoro-1,4-phenylene for increasing the optical anisotropy, 1,4-cyclohexylene for decreasing the viscosity, and 3,5-difluoro-1,4-phenylene for increasing the dielectric anisotropy. Ring D, ring E and ring F are independently 1,4-cyclohexylene, 1,4-phenylene, 2-fluoro-1,4-phenylene or 3-fluoro-1,4-phenylene, and two of arbitrary ring E when r is 2 or 3 is may be identical or different. Preferred ring D, ring E or ring F is 1,4-phenylene or 3-fluoro-1,4-phenylene for increasing the optical anisotropy, and 1,4-cyclohexylene for decreasing the viscosity. With regard to a configuration of 1,4-cyclohexylene, trans is preferred to cis for increasing the maximum temperature.

$Z^1$ and $Z^2$ are independently a single bond, ethylene or carbonyloxy, two of arbitrary $Z^1$ when p is 2 or 3 may be identical or different, and two of arbitrary $Z^2$ when r is 2 or 3 may be identical or different. Preferred $Z^1$ is a single bond for decreasing the viscosity, and carbonyloxy for increasing the dielectric anisotropy. Preferred $Z^2$ is a single bond for decreasing the viscosity.

$X^1$, $X^2$, $X^3$, $X^4$ and $X^5$ are independently hydrogen or fluorine. Preferred $X^1$, $X^2$, $X^3$, $X^4$ or $X^5$ is fluorine for increasing the dielectric anisotropy.

$Y^1$ and $Y^2$ are independently fluorine, chlorine or trifluoromethoxy. Preferred $Y^1$ or $Y^2$ is fluorine for decreasing the viscosity.

Then, m is 2 or 3, n is 0 or 1, and a sum of m and n is 3. Preferred m is 3 for increasing the optical anisotropy. Preferred n is 0 for increasing the maximum temperature.

Fifth, the specific examples of the component compounds will be shown. In preferred compounds as described below, $R^1$ and $R^4$ are independently alkyl having 1 to 12 carbons or alkenyl having 2 to 12 carbons, $R^7$, $R^8$ and $R^9$ are independently alkyl having 1 to 12 carbons, alkoxy having 1 to 12 carbons or alkenyl having 2 to 12 carbons. $R^3$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Preferred compound (1) includes compound (1-1) and compound (1-2). Further preferred compound (1) includes compound (1-1). Preferred compound (2) includes compound (2-1). Preferred compound (3) includes compound (3-1-1) to compound (3-5-13). Further preferred compound (3) includes compound (3-2-1), compound (3-4-2), compound (3-4-3), compound (3-5-8) and compound (3-5-13). Particularly preferred compound (3) includes compound (3-2-1), compound (3-4-2) and compound (3-4-3). Preferred compound (4) includes compound (4-1-1-1) to compound (4-2-9-1). Further preferred compound (4) includes compound (4-2-1-1), compound (4-2-4-1) and compound (4-2-8-1). Particularly preferred compound (4) includes compound (4-2-1-1) and compound (4-2-4-1).

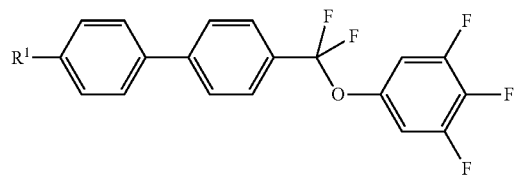

(1-1)

(1-2)
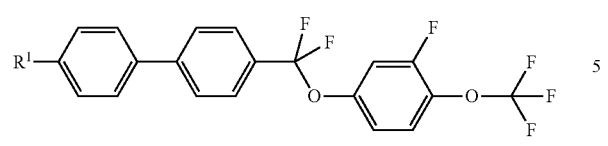
(2-1)
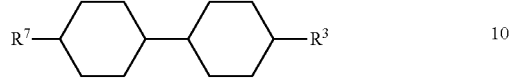
(3-1-1)
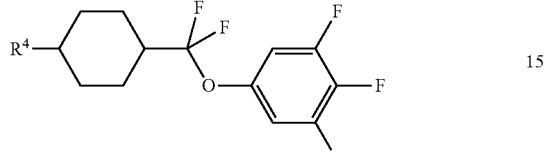
(3-2-1)
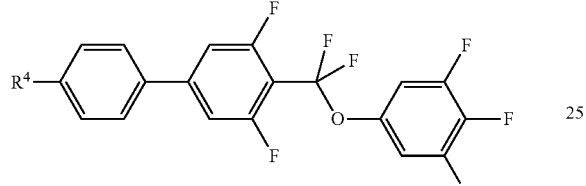
(3-2-2)
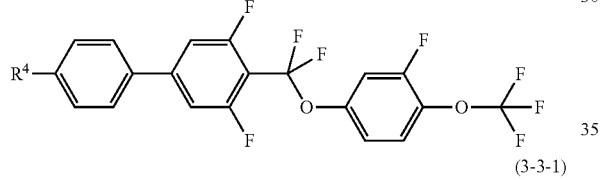
(3-3-1)
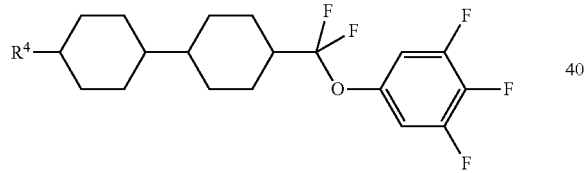
(3-4-1)
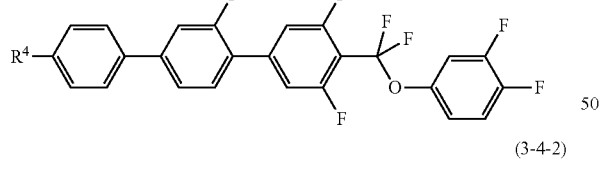
(3-4-2)
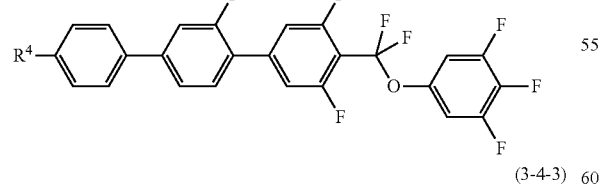
(3-4-3)
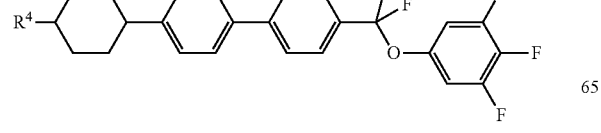
(3-5-1)
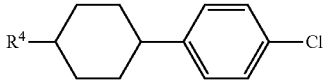
(3-5-2)
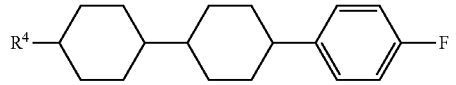
(3-5-3)
(3-5-4)
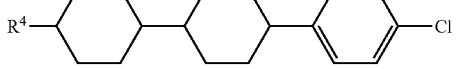
(3-5-5)
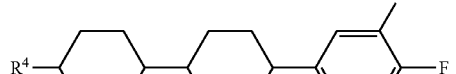
(3-5-6)
(3-5-7)
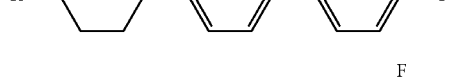
(3-5-8)
(3-5-9)
(3-5-10)
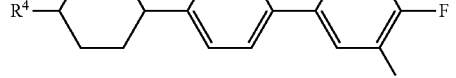
(3-5-11)
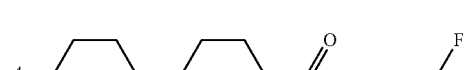

(3-5-12)
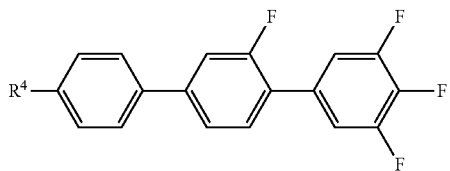

(3-5-13)
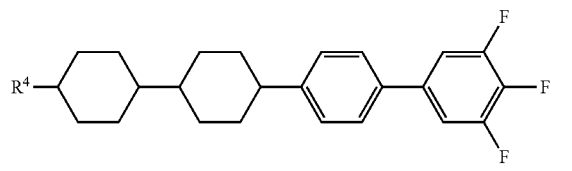

(4-1-1-1)
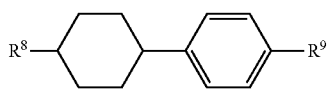

(4-1-2-1)
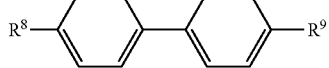

(4-2-1-1)

(4-2-2-1)
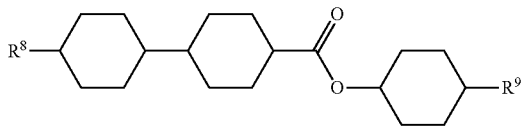

(4-2-3-1)
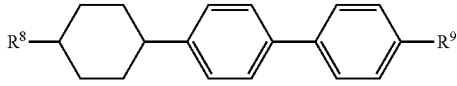

(4-2-4-1)
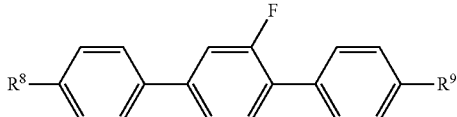

(4-2-5-1)
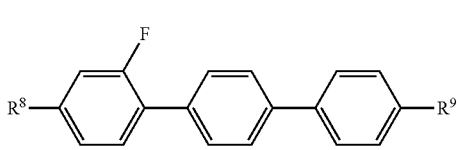

(4-2-6-1)
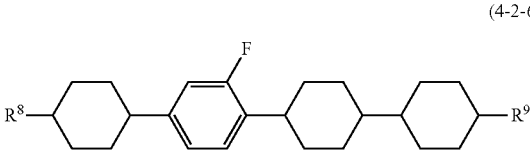

(4-2-7-1)
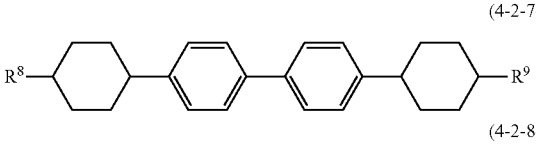

(4-2-8-1)
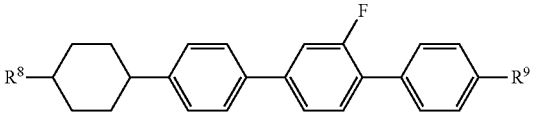

(4-2-9-1)
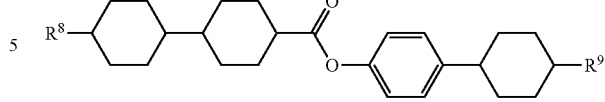

Sixth, the additive that may be mixed with the composition will be explained. Such an additive includes the optically active compound, the antioxidant, the ultraviolet light absorber, the dye, the antifoaming agent, the polymerizable compound and the polymerization initiator. The optically active compound is mixed with the composition for the purpose of inducing a helical structure in liquid crystals to give a twist angle. Examples of such a compound include compound (5-1) to compound (5-5). A preferred ratio of the optically active compound is about 5% by weight or less. A further preferred ratio is in the range of about 0.01% by weight to about 2% by weight.

(5-1)
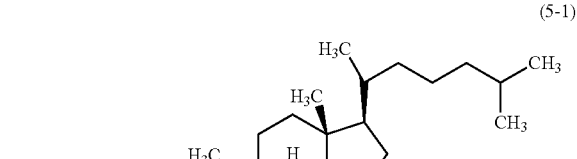

(5-2)
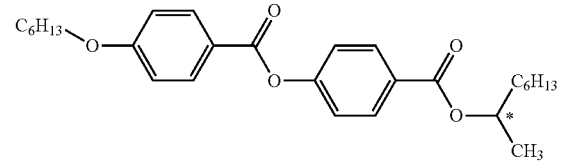

(5-3)
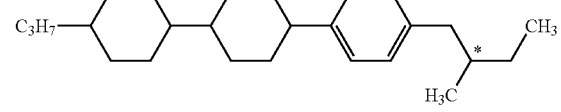

(5-4)
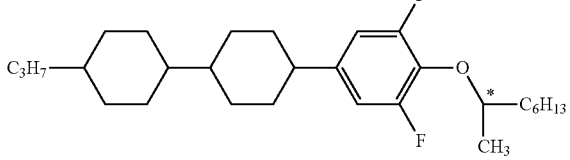

(5-5)
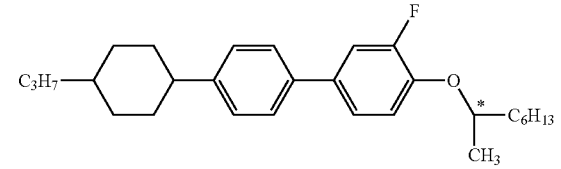

The antioxidant is mixed with the composition for the purpose of preventing a decrease in the specific resistance as caused by heating in air, or maintaining a large voltage holding ratio at room temperature and also at a temperature close to the maximum temperature of the nematic phase even after the device has been used for a long period of time.

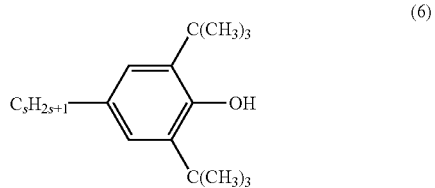

(6)

Preferred examples of the antioxidant include compound (6) where s an integer from 1 to 9. In compound (6), preferred s is 1, 3, 5, 7 or 9. Further preferred s is 1 or 7. Compound (6) where s is 1 is effective in preventing a decrease in the specific resistance as caused by heating in air because the compound (6) has a large volatility. Compound (6) where s is 7 is effective in maintaining a large voltage holding ratio at room temperature and also at a temperature close to the maximum temperature of the nematic phase even after the device has been used for a long period of time because the compound (6) has a small volatility. A preferred ratio of the antioxidant is about 50 ppm or more for achieving the effect thereof, and about 600 ppm or less for avoiding a decrease in the maximum temperature or avoiding an increase in the minimum temperature. A further preferred ratio is in the range of about 100 ppm to about 300 ppm.

Preferred examples of the ultraviolet light absorber include a benzophenone derivative, a benzoate derivative and a triazole derivative. A light stabilizer such as an amine having steric hindrance is also preferred. A preferred ratio of the ultraviolet light absorber or the stabilizer is about 50 ppm or more for achieving the effect thereof, and about 10,000 ppm or less for avoiding a decrease in the maximum temperature or avoiding an increase in the minimum temperature. A further preferred ratio is in the range of about 100 ppm to about 10,000 ppm.

A dichroic dye such as an azo dye or an anthraquinone dye is mixed with the composition to be adapted for a device having a guest host (GH) mode. A preferred ratio of the dye is in the range of about 0.01% by weight to about 10% by weight. The antifoaming agent such as dimethyl silicone oil or methyl phenyl silicone oil is mixed with the composition for preventing foam formation. A preferred ratio of the antifoaming agent is about 1 ppm or more for achieving the effect thereof, and about 1,000 ppm or less for avoiding a poor display. A further preferred ratio is in the range of about 1 ppm to about 500 ppm.

The polymerizable compound is mixed with the composition to be adapted for a device having the polymer sustained alignment (PSA) mode. Preferred examples of the polymerizable compound include a compound having a polymerizable group, such as an acrylate, a methacrylate, a vinyl compound, a vinyloxy compound, a propenyl ether, an epoxy compound (oxirane, oxetane) and a vinyl ketone. Particularly preferred examples include an acrylate derivative or a methacrylate derivative. A preferred ratio of the polymerizable compound is about 0.05% by weight or more for achieving the effect thereof, and about 10% by weight or less for avoiding a poor display. A further preferred ratio is in the range of about 0.1% by weight to about 2% by weight. The polymerizable compound is preferably polymerized by irradiation with ultraviolet light or the like in the presence of a suitable initiator such as a photopolymerization initiator. Suitable conditions for polymerization, suitable types of the initiator and suitable amounts thereof are known to a person skilled in the art and are described in literatures. For example, Irgacure 651 (registered trade name), Irgacure 184 (registered trade name) or Darocure 1173 (registered tradename) (BASF), each being a photopolymerization initiator, is suitable for radical polymerization. A preferred ratio of the photopolymerization initiator is in the range of about 0.1% by weight to about 5% by weight of the polymerizable compound, and a particularly preferred ratio is in the range of about 1% by weight to about 3% by weight.

Seventh, the methods for synthesizing the component compounds will be explained. Compound (1) to compound (4) can be prepared according to known methods. Examples of synthetic methods will be shown. Compound (1-1) is prepared by the method described in JP 2006-169174 A. Compound (2-1) is prepared by the method described in JP S59-70624 A and JP S59-176221 A. Compound (3-2-1) and compound (3-2-2) are prepared by the method described in JP H10-251186 A. Compound (3-5-7) to compound (3-5-10), and compound (3-5-13) are prepared by the method described in JP H2-233626 A. Compound (4-2-1-1) is prepared by the method described in JP S59-176221 A. The antioxidant is commercially available. A compound represented by formula (6) where s is 1 is available from Sigma-Aldrich Corporation. Compound (6) where s is 7 and so forth are prepared according to the method described in U.S. Pat. No. 3,660,505 B.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be explained. The compositions of the invention mainly has a minimum temperature of about −10° C. or lower, a maximum temperature of about 70° C. or higher, and an optical anisotropy in the range of about 0.07 to about 0.20. The device including the composition has a large voltage holding ratio. The composition is suitable for use in the AM device. The composition is particularly suitable for use in a transmissive AM device. A composition having an optical anisotropy in the range of about 0.08 to about 0.25 or further a composition having an optical anisotropy in the range of about 0.10 to about 0.30 may be prepared by controlling the ratio of the component compounds or by mixing with any other liquid crystal compound. The composition can be used as the composition having the nematic phase or as the optically active composition by adding the optically active compound.

A preferred minimum temperature of the nematic phase of the liquid crystal composition of the invention is at least about 0° C. or lower, a further preferred minimum temperature of the nematic phase is about −20° C. or lower, and a particularly preferred minimum temperature of the nematic phase is about −30° C. or lower.

A preferred maximum temperature of the nematic phase of the liquid crystal composition of the invention is at least about 70° C. or higher, a further preferred maximum temperature of the nematic phase is about 80° C. or higher, and a particularly preferred maximum temperature of the nematic phase is about 90° C. or higher.

A preferred optical anisotropy (at 25° C., at 589 nanometers) of the liquid crystal composition of the invention is in the range of about 0.07 to about 0.20, a further preferred optical anisotropy is in the range of about 0.07 to about 0.16, and a particularly preferred optical anisotropy is in the range of about 0.08 to about 0.13.

A preferred dielectric anisotropy (at 25° C.) of the liquid crystal composition of the invention is at least about 3 or more, a further preferred dielectric anisotropy is about 4 or more, and a particular further preferred dielectric anisotropy is about 5 or more.

The composition can be used for the AM device. The composition can also be used for a PM device. The composition can be used for an AM device and a PM device both having the mode such as the PC, TN, STN, ECB, OCB, IPS, FFS, VA or PSA mode. Use for an AM device having the TN mode, the OCB mode, the IPS mode or the FFS mode is particularly preferred. In an AM device having the IPS mode or the FFS mode, alignment of liquid crystal molecules under a state of no voltage application may be in parallel to or perpendicular to a panel substrate. The devices may be of a reflective type, a transmissive type or a transflective type. Use for the transmissive device is preferred. The composition can also be used for an amorphous silicon-TFT device or a polycrystal silicon-TFT device. The composition can also be used for a nematic curvilinear aligned phase (NCAP) device prepared by microencapsulating the composition, or for a polymer dispersed (PD) device in which a three-dimensional network-polymer is formed in the composition.

EXAMPLES

In order to evaluate a composition and a compound to be contained in the composition, the composition and the compound were made a measurement object. When the measurement object was the composition, the composition was measured using as a sample as was, and values obtained were described. When the measurement object was the compound, a sample for measurement was prepared by mixing the compound (15% by weight) with a base liquid crystal (85% by weight). Values of characteristics of the compound were calculated using values obtained by measurement, according to an extrapolation method: (extrapolated value)={(measured value of a sample for measurement)−0.85×(measured value of base liquid crystal)}/0.15. When a smectic phase (or crystals) precipitated at the ratio thereof at 25° C., a ratio of the compound to the base liquid crystal was changed step by step in the order of (10% by weight:90% by weight), (5% by weight:95% by weight) and (1% by weight:99% by weight). Values of a maximum temperature, optical anisotropy, viscosity and dielectric anisotropy with regard to the compound were determined according to the extrapolation method.

Components of the base liquid crystal were as described below. A ratio of each component was expressed in terms of weight percent.

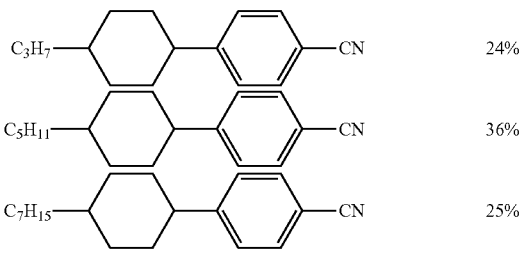

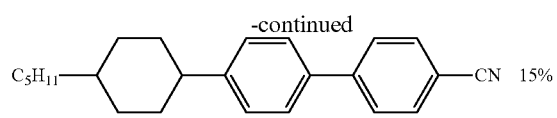

Physical properties were measured according to the methods described below. Most of the methods were applied as described in a Standard of the Japan Electronics and Information Technology Industries Association, hereafter abbreviated as JEITA) (JEITA ED-2521B) as discussed and established in JEITA, or as modified thereon.

Maximum Temperature of a Nematic Phase (NI; ° C.):

A sample was placed on a hot plate in a melting point apparatus equipped with a polarizing microscope and was heated at a rate of 1° C. per minute. Temperature when part of the sample began to change from a nematic phase to an isotropic liquid was measured. A maximum temperature of the nematic phase may be occasionally abbreviated as "maximum temperature."

Minimum Temperature of a Nematic Phase ($T_c$; ° C.):

Samples each having a nematic phase were put in glass vials and kept in freezers at 0° C., −10° C., −20° C., −30° C. and −40° C. for 10 days, and then liquid crystal phases were observed. For example, when a sample maintained the nematic phase at −20° C. and changed to crystals or a smectic phase at −30° C., $T_c$ was expressed as "$T_c \leq 20°$ C." A minimum temperature of the nematic phase may be occasionally abbreviated as "minimum temperature."

Viscosity (Bulk Viscosity; η; Measured at 20° C.; mPa·s):

A cone-plate (E type) rotational viscometer was used for measurement.

Viscosity (Rotational Viscosity; γ1; Measured at 25° C.; mPa·s):

Measurement was carried out according to the method described in M. Imai et al., Molecular Crystals and Liquid Crystals, Vol. 259, p. 37 (1995). A sample was put in a TN device in which a twist angle was 0 degrees and a distance (cell gap) between two glass substrates was 5 micrometers. Voltage was stepwise applied to the TN device in the range of 16 V to 19.5 V at an increment of 0.5 V. After a period of 0.2 second with no application, voltage was applied repeatedly under the conditions of only one of rectangular waves (rectangular pulse; 0.2 second) and no application (2 seconds). A peak current and a peak time of a transient current generated by the application were measured. A value of rotational viscosity was obtained from the measured values and a calculation equation (8) described on page 40 of the paper presented by M. Imai et al. A value of dielectric anisotropy required for the calculation was determined by using the device used for measuring the rotational viscosity and according to a method described below.

Optical Anisotropy (Refractive Index Anisotropy; Δn; Measured at 25° C.):

Measurement was carried out by means of Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy was calculated from an equation: Δn=n∥−n⊥.

Dielectric Anisotropy (Δ∈; Measured at 25° C.):

A sample was put in a TN device in which a distance (cell gap) between two glass substrates was 9 micrometers and a twist angle was 80 degrees. Sine waves (10 V, 1 kHz) were applied to the device, and after 2 seconds, a dielectric constant ($\in_{\parallel}$) in the major axis direction of liquid crystal molecules was measured. Sine waves (0.5 V, 1 kHz) were applied to the device, and after 2 seconds, a dielectric constant ($\in_{\perp}$) in the minor axis direction of the liquid crystal molecules was measured. A value of dielectric anisotropy was calculated from an equation: $\Delta\in = \in_{\parallel} - \in_{\perp}$.

Threshold Voltage (Vth; measured at 25° C.; V):

An LCD-5100 luminance meter made by Otsuka Electronics Co., Ltd. was used for measurement. A light source was a halogen lamp. A sample was put in a normally white mode TN device in which a distance (cell gap) between two glass substrates was about 0.45/Δn micrometers and a twist angle was 80 degrees. A voltage (60 Hz, rectangular waves) to be applied to the device was stepwise increased from 0 V to 10 V at an increment of 0.02 V. On the occasion, the device was irradiated with light from a direction perpendicular to the device, and the amount of light transmitted through the device was measured. A voltage-transmittance curve was prepared, in which the maximum amount of light corresponds to 100% transmittance and the minimum amount of light corresponds to 0% transmittance. A threshold voltage is a voltage at 90% transmittance.

Voltage Holding Ratio (VHR-1; at 25° C.; %):

A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Voltage Holding Ratio (VHR-2; at 80° C.; %):

A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Voltage Holding Ratio (VHR-3; at 25° C.; %):

Stability to ultraviolet light was evaluated by measuring a voltage holding ratio after a device was irradiated with ultraviolet light. A TN device used for measurement had a polyimide alignment film, and a cell gap was 5 micrometers. A sample was injected into the device, and then the device was irradiated with light for 20 minutes. A light source was an ultra high-pressure mercury lamp USH-500D (made by Ushio, Inc.), and a distance between the device and the light source was 20 centimeters. In measurement of VHR-3, a decaying voltage was measured for 16.7 milliseconds. A composition having a large VHR-3 has a large stability to ultraviolet light. A value of VHR-3 is preferably 90% or more, further preferably, 95% or more.

Voltage Holding Ratio (VHR-4; at 25° C.; %):

A TN device into which a sample was injected was heated in a constant-temperature bath at 80° C. for 500 hours, and then stability to heat was evaluated by measuring a voltage holding ratio. In measurement of VHR-4, a decaying voltage was measured for 16.7 milliseconds. A composition having a large VHR-4 has a large stability to heat.

Response Time ($\tau$; Measured at 25° C.; ms):

An LCD-5100 luminance meter made by Otsuka Electronics Co., Ltd. was used for measurement. A light source was a halogen lamp. A low-pass filter was set at 5 kHz. A sample was put in a normally white mode TN device in which a distance (cell gap) between two glass substrates was 5.0 micrometers and a twist angle was 80 degrees. Rectangular waves (60 Hz, 5 V, 0.5 second) were applied to the device. On the occasion, the device was irradiated with light from a direction perpendicular to the device, and the amount of light transmitted through the device was measured. The maximum amount of light corresponds to 100% transmittance, and the minimum amount of light corresponds to 0% transmittance. Rise time ($\tau r$; millisecond) is a period of time required for a change from 90% transmittance to 10% transmittance. Fall time ($\tau f$; millisecond) is a period of time required for a change from 10% transmittance to 90% transmittance. Response time is a sum of the thus obtained rise time and fall time.

Elastic Constant (K; Measured at 25° C.; pN):

HP4284A LCR Meter made by Yokogawa-Hewlett-Packard Co. was used for measurement. A sample was put in a vertical alignment cell in which a distance (cell gap) between two glass substrates was 20 micrometers. Voltage was applied to the cell in the range of 0 V to 20 V, and electrostatic capacity and applied voltage were measured. Measured values of the electrostatic capacity (C) and the applied voltage (V) were fitted to equation (2.98) and equation (2.101) on page 75 of "Liquid Crystal Device Handbook" (Ekisho Debaisu Handobukku in Japanese) (The Nikkan Kogyo Shimbun, Ltd.), and values of K11 and K33 were obtained from equation (2.99). Next, K22 was calculated using the previously determined values of K11 and K33 in equation (3.18) on page 171 of the same Handbook. An elastic constant is a mean value of the thus determined K11, K22 and K33.

Specific Resistance ($\rho$; Measured at 25° C.; $\Omega$cm):

Into a vessel equipped with electrodes, 1.0 milliliter of a sample was injected. A DC voltage (10 V) was applied to the vessel, and a DC current after 10 seconds was measured. A specific resistance was calculated from the following equation: (specific resistance)={(voltage)×(electric capacity of a vessel)}/{(direct current)×(dielectric constant of vacuum)}.

Helical Pitch (P; Measured at Room Temperature; μm):

A helical pitch was measured according to a wedge method (Handbook of Liquid Crystals (Ekisho Binran in Japanese), page 196, (issued in 2000, Maruzen Co., Ltd.)). A sample was injected into a wedge cell and left to stand at room temperature for 2 hours, and then a gap (d2−d1) between disclination lines was observed by means of a polarizing microscope (trade name: MM40/60 series, Nikon Corporation). The helical pitch (P) was calculated according to the following equation in which an angle of the wedge cell was expressed as θ:

$$P = 2 \times (d2-d1) \times \tan \theta.$$

Gas Chromatographic Analysis:

GC-14B Gas Chromatograph made by Shimadzu Corporation was used for measurement. A carrier gas was helium (2 mL per minute). A sample injector and a detector (FID) were set to 280° C. and 300° C., respectively. A capillary column DB-1 (length 30 m, bore 0.32 mm, film thickness 0.25 μm; dimethylpolysiloxane as a stationary liquid phase, non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample injector. A recorder was C-R5A Chromatopac made by Shimadzu Corporation or the equivalent thereof. The resulting chromatogram showed a retention time of a peak and a peak area corresponding to each of the component compounds.

As a solvent for diluting the sample, chloroform, hexane and so forth may also be used. The following capillary columns may also be used for separating the component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of avoiding an overlap of peaks of the compounds.

A ratio of liquid crystal compounds contained in the composition may be calculated by the method as described below. The liquid crystal compounds can be detected by means of a gas chromatograph. A ratio of the peak areas in the gas chromatogram corresponds to a ratio (in the number of moles) of the liquid crystal compounds. When the capillary columns described above were used, a correction coefficient of each of the liquid crystal compounds may be regarded as 1 (one). Accordingly, a ratio (% by weight) of the liquid crystal compounds was calculated from the ratio of the peak areas.

The invention will be explained in detail by way of Examples. The invention is not limited by the Examples described below. The compounds in Comparative Examples and Examples were described using symbols according to definitions in Table 3 below. In Table 3, a configuration of 1,4-cyclohexylene is trans. A parenthesized number next to a symbolized compound corresponds to the number of the compound. A symbol (-) means any other liquid crystal compound. A ratio (percentage) of the liquid crystal compounds is expressed in terms of weight percent (% by weight) based on the total weight of the liquid crystal composition. The liquid crystal composition contains an impurity. Values of characteristics of the composition were summarized in the last part.

TABLE 3

Method for Description of Compounds using Symbols
R—(A$_1$)—Z$_1$— · · · —Z$_n$—(A$_n$)—R'

| 1) Left-terminal Group R— | Symbol |
|---|---|
| $C_nH_{2n+1}$— | n- |
| $C_nH_{2n+1}O$— | nO— |
| $C_mH_{2m+1}OC_nH_{2n}$— | mOn- |
| $CH_2$=CH— | V— |
| $C_nH_{2n+1}$—CH=CH— | nV— |
| $CH_2$=CH—$C_nH_{2n}$— | Vn- |
| $C_mH_{2m+1}$—CH=CH—$C_nH_{2n}$— | mVn- |
| $CF_2$=CH— | VFF— |
| $CF_2$=CH—$(CH_2)_2$— | VFF2— |
| 2) Right-terminal Group —R' | Symbol |
| —$C_nH_{2n+1}$ | -n |
| —$OC_nH_{2n+1}$ | —On |
| —F | —F |
| —Cl | —CL |
| —$OCF_3$ | —OCF3 |
| —CH=$CH_2$ | —V |
| —CH=CH—$C_nH_{2n+1}$ | —Vn |

TABLE 3-continued

Method for Description of Compounds using Symbols
R—(A$_1$)—Z$_1$— · · · —Z$_n$—(A$_n$)—R'

| | |
|---|---|
| —$C_nH_{2n}$—CH=$CH_2$ | -nV |
| —CH=$CF_2$ | —VFF |
| 3) Bonding Group —$Z_n$— | Symbol |
| —$C_2H_4$— | 2 |
| —COO— | E |
| —CH=CH— | V |
| —C≡C— | T |
| —$CF_2O$— | X |
| 4) Ring Structure —$A_n$— | Symbol |

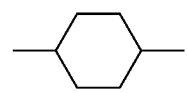 H

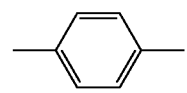 B

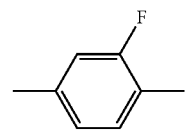 B(F)

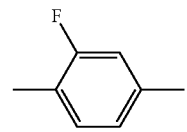 B(2F)

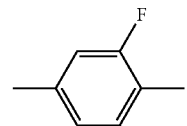 B(F,F)

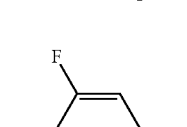 B(2F,5F)

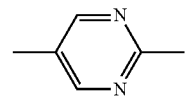 Py

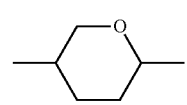 dh

TABLE 3-continued

Method for Description of Compounds using Symbols
R—(A₁)—Z₁— - - - —Zₙ—(Aₙ)—R'

G: [tetrahydropyran-dioxane ring structure]

5) Example of Description

Example 1  3-BBXB(F,F)-F
[structure]

Example 2  3-BB(F)B(F,F)XB(F,F)-F
[structure]

Example 3  3-HH-V
[structure]

Example 4  V2-HHB-1
[structure]

Comparative Example 1

Example 8 was selected from compositions disclosed in JP 2004-210855 A. The reason is that the composition contains compound (1) and compound (1-1) of a first component, compound (3-2), compound (3-2-1) and compound (3-5-6) of a third component, and compound (4-1-1-1) of a fourth component. Components and characteristics of the composition are as described below.

| | | |
|---|---|---|
| 3-PyB(F)-F | (—) | 10% |
| 3-PyBB-F | (—) | 10% |
| 4-PyBB-F | (—) | 10% |
| 5-PyBB-F | (—) | 10% |
| 3-HB(F)TB-2 | (—) | 5% |
| 3-HB(F)TB-3 | (—) | 5% |
| 4-HBB(F)-F | (3-5-6) | 3.4% |
| 5-HBB(F)-F | (3-5-6) | 3.3% |
| 7-HBB(F)-F | (3-5-6) | 3.3% |
| 3-BB(F,F)XB(F,F)-F | (3-2-1) | 2% |
| 3-BB(F,F)XB(F)-F | (3-2) | 2% |
| 3-BB(F,F)XB-F | (3-2) | 2% |
| 3-BBXB(F,F)-F | (1-1) | 2% |
| 3-BBXB(F)-F | (1) | 2% |
| 2-BTB-O1 | (—) | 4% |
| 3-BTB-O1 | (—) | 4% |
| 4-BTB-O1 | (—) | 4% |
| 4-BTB-O2 | (—) | 4% |
| 5-BTB-O1 | (—) | 4% |
| 3-HB-O2 | (4-1-1-1) | 10% |

NI = 89.2° C.;
Tc ≤ −30° C.;
$\Delta n$ = 0.219;
$\Delta \epsilon$ = 7.7;
$\eta$ = 34.2 mPa · s;
$\Delta \epsilon$ = 7.7.

Comparative Example 2

Example 11 was selected from compositions disclosed in JP 2002-327175 A. The reason is that the composition contains compound (1-1) of a first component, compound (3-2), compound (3-2-1) and compound (3-5) of a third component, and compound (4-2-8-1) of a fourth component. In order to compare physical properties under conditions identical with the conditions of the present invention, the composition was prepared and measurement was carried out according to the method described above. Components and characteristics of the composition are as described below.

| | | |
|---|---|---|
| 3-BBB(F,F)-F | (3-5) | 5% |
| 3-BB2B(F,F)-F | (3-5) | 10% |
| 3-B2BB(F,F)-F | (3-5) | 10% |
| 3-BB(F,F)XB(F,F)-F | (3-2-1) | 20% |
| 3-BB(F,F)XB(F,F)-OCF3 | (3-2) | 10% |
| 3-BBXB(F,F)-F | (1-1) | 10% |
| 3-BB(F,F)XBB-5 | (—) | 5% |
| 5-BB(F,F)XBB-2 | (—) | 5% |
| 2-BB(F,F)XBB-5 | (—) | 5% |
| 5-HBB(F)B-2 | (4-2-8-1) | 10% |
| 5-HBB(F)B-3 | (4-2-8-1) | 10% |

NI = 103.7° C.;
Tc ≤ −30° C.;
$\Delta n$ = 0.186;
$\Delta \epsilon$ = 14.9;
$\eta$ = 66.0 mPa · s.

Example 1

| | | |
|---|---|---|
| 3-BBXB(F,F)-F | (1-1) | 6% |
| 5-BBXB(F,F)-F | (1-1) | 4% |
| 3-HH-V | (2-1) | 44% |
| 3-BB(F,F)XB(F,F)-F | (3-2-1) | 6% |
| 3-BB(F)B(F,F)XB(F,F)-F | (3-4-2) | 3% |
| 4-BB(F)B(F,F)XB(F,F)-F | (3-4-2) | 6% |
| 3-HBB-F | (3-5-3) | 5% |
| 3-HBB-2 | (4-2-3-1) | 5% |
| 1-BB(F)B-2V | (4-2-4-1) | 7% |
| 2-BB(F)B-2V | (4-2-4-1) | 9% |
| 5-B(F)BB-2 | (4-2-5-1) | 5% |

NI = 75.3° C.;
Tc ≤ −20° C.;
$\Delta n$ = 0.130;
$\Delta \epsilon$ = 4.6;
$\eta$ = 13.1 mPa · s;
Vth = 2.02 V;
VHR-1 = 99.2%;
VHR-2 = 98.4%.

Example 2

| | | |
|---|---|---|
| 3-BBXB(F,F)-F | (1-1) | 7% |
| 3-HH-V | (2-1) | 20% |

| 5-HXB(F,F)-F | (3-1-1) | 5% |
| 3-BB(F,F)XB(F,F)-F | (3-2-1) | 10% |
| 3-HHXB(F,F)-F | (3-3-1) | 9% |
| 4-BB(F)B(F,F)XB(F,F)-F | (3-4-2) | 8% |
| 5-BB(F)B(F,F)XB(F,F)-F | (3-4-2) | 5% |
| 3-HBB(F,F)-F | (3-5-8) | 6% |
| 3-HHBB(F,F)-F | (3-5-13) | 3% |
| 4-HHBB(F,F)-F | (3-5-13) | 3% |
| 3-HB-O2 | (4-1-1-1) | 5% |
| V-HHB-1 | (4-2-1-1) | 10% |
| 5-HBBH-3 | (4-2-7-1) | 5% |
| 5-HBB(F)B-2 | (4-2-8-1) | 4% |

NI = 88.4° C.;
Tc ≤ −20° C.;
Δn = 0.118;
Δε = 9.5;
η = 17.6 mPa · s;
Vth = 1.71 V;
VHR-1 = 98.8%;
VHR-2 = 97.7%.

Comparative Example 3

Compound I of JP 2008-156642 A was used in place of compound (1-1) in Example 2. The composition was prepared and measurement was carried out according to the method described above. Components and characteristics of the composition are as described below. The composition in Comparative Example 3 has a lower maximum temperature and a larger viscosity in comparison with the composition in Example

| 3-B(F)BXB(F,F)-F | (—) | 7% |
| 3-HH-V | (2-1) | 20% |
| 5-HXB(F,F)-F | (3-1-1) | 5% |
| 3-BB(F,F)XB(F,F)-F | (3-2-1) | 10% |
| 3-HHXB(F,F)-F | (3-3-1) | 9% |
| 4-BB(F)B(F,F)XB(F,F)-F | (3-4-2) | 8% |
| 5-BB(F)B(F,F)XB(F,F)-F | (3-4-2) | 5% |
| 3-HBB(F,F)-F | (3-5-8) | 6% |
| 3-HHBB(F,F)-F | (3-5-13) | 3% |
| 4-HHBB(F,F)-F | (3-5-13) | 3% |
| 3-HB-O2 | (4-1-1-1) | 5% |
| V-HHB-1 | (4-2-1-1) | 10% |
| 5-HBBH-3 | (4-2-7-1) | 5% |
| 5-HBB(F)B-2 | (4-2-8-1) | 4% |

NI = 86.9° C.;
Tc ≤ −20° C.;
Δn = 0.118;
η = 18.5 mPa · s.

Example 3

| 3-BBXB(F,F)-F | (1-1) | 7% |
| 2-HH-3 | (2-1) | 19% |
| 3-HH-4 | (2-1) | 10% |
| 3-BB(F,F)XB(F,F)-F | (3-2-1) | 7% |
| 4-BB(F)B(F,F)XB(F,F)-F | (3-4-2) | 5% |
| 3-HB-CL | (3-5-1) | 10% |
| 3-HHB-CL | (3-5-4) | 3% |
| 5-HHB-CL | (3-5-4) | 3% |
| 3-HBB(F,F)-F | (3-5-8) | 8% |
| 3-HHBB(F,F)-F | (3-5-13) | 3% |
| 4-HHBB(F,F)-F | (3-5-13) | 3% |
| 3-HHB-1 | (4-2-1-1) | 5% |
| 2-BB(F)B-3 | (4-2-4-1) | 5% |
| 5-HBB(F)B-2 | (4-2-8-1) | 6% |
| 5-HBB(F)B-3 | (4-2-8-1) | 6% |

NI = 94.7° C.;
Tc ≤ −20° C.;
Δn = 0.124;
Δε = 5.6;
η = 14.2 mPa · s;
Vth = 2.29 V;
VHR-1 = 99.0%;
VHR-2 = 97.9%.

Example 4

| 2-BBXB(F,F)-F | (1-1) | 5% |
| 3-HH-4 | (2-1) | 10% |
| 3-HH-5 | (2-1) | 6% |
| 3-BB(F,F)XB(F,F)-F | (3-2-1) | 16% |
| 3-HB-CL | (3-5-1) | 8% |
| 3-HHB-F | (3-5-2) | 4% |
| 3-HBB-F | (3-5-3) | 3% |
| 3-HHB-CL | (3-5-4) | 3% |
| 3-HBB(F)-F | (3-5-6) | 10% |
| 5-HBB(F)-F | (3-5-6) | 10% |
| 2-HHB(F,F)-F | (3-5-7) | 10% |
| 7-HB-1 | (4-1-1-1) | 5% |
| 3-HHB-1 | (4-2-1-1) | 5% |
| 3-HHEBH-3 | (4-2-9-1) | 5% |

NI = 75.3° C.;
Tc ≤ −20° C.;
Δn = 0.099;
Δε = 6.9;
η = 17.2 mPa · s;
Vth = 1.76 V.

Example 5

| 3-BBXB(F,F)-F | (1-1) | 6% |
| 3-HH-V | (2-1) | 35% |
| 3-HH-V1 | (2-1) | 10% |
| 4-HH-V1 | (2-1) | 3% |
| 3-BB(F,F)XB(F,F)-F | (3-2-1) | 11% |
| 3-BB(F)B(F,F)XB(F,F)-F | (3-4-2) | 3% |
| 4-BB(F)B(F,F)XB(F,F)-F | (3-4-2) | 6% |
| 1V2-HHB-1 | (4-2-1-1) | 7% |
| 1-BB(F)B-2V | (4-2-4-1) | 7% |
| 2-BB(F)B-2V | (4-2-4-1) | 9% |
| 3-BB(F)B-2V | (4-2-4-1) | 3% |

NI = 76.6° C.;
Tc ≤ −20° C.;
Δn = 0.123;
Δε = 4.8;
η = 13.2 mPa · s;
Vth = 2.08 V;
VHR-1 = 99.1%;
VHR-2 = 98.4%.

Example 6

| 3-BBXB(F,F)-F | (1-1) | 7% |
| 3-HH-V | (2-1) | 15% |
| 3-BB(F,F)XB(F,F)-F | (3-2-1) | 10% |
| 3-BB(F,F)XB(F)-OCF3 | (3-2-1) | 5% |
| 3-HHXB(F,F)-F | (3-3-1) | 7% |
| 4-BB(F)B(F,F)XB(F,F)-F | (3-4-2) | 5% |
| 3-HBBXB(F,F)-F | (3-4-3) | 5% |

-continued

| | | |
|---|---|---|
| 3-HBB(F,F)-F | (3-5-8) | 3% |
| 3-GHB(F,F)-F | (3-5-11) | 5% |
| 3-HHHB(F,F)-F | (3-5-13) | 4% |
| 5-HB-O2 | (4-1-1-1) | 5% |
| V2-BB-1 | (4-1-2-1) | 5% |
| V-HHB-1 | (4-2-1-1) | 10% |
| V2-HHB-1 | (4-2-1-1) | 5% |
| 5-B(F)BB-2 | (4-2-5-1) | 5% |
| 5-HBB(F)B-2 | (4-2-8-1) | 4% |

NI = 85.6° C.;
Tc ≤ -20° C.;
Δn = 0.128;
Δε = 9.5;
η = 16.6 mPa · s;
Vth = 1.70 V.

Example 7

| | | |
|---|---|---|
| 3-BBXB(F,F)-F | (1-1) | 5% |
| 3-BBXB(F)-OCF3 | (1-2) | 5% |
| 3-HH-V | (2-1) | 33% |
| 3-BB(F)B(F,F)XB(F)-F | (3-4-1) | 10% |
| 3-HBB(F)-F | (3-5-6) | 10% |
| 3-HHEB(F,F)-F | (3-5-9) | 10% |
| 3-BB(F)B(F,F)-F | (3-5-12) | 10% |
| 3-HHB-O1 | (4-2-1-1) | 6% |
| 2-BB(F)B-3 | (4-2-4-1) | 6% |
| 3-HBBH-1O1 | (—) | 5% |

NI = 87.5° C.;
Tc ≤ -20° C.;
Δn = 0.123;
Δε = 6.3;
η = 16.0 mPa · s;
Vth = 1.98 V.

Example 8

| | | |
|---|---|---|
| 3-BBXB(F)-OCF3 | (1-2) | 5% |
| 3-HH-V | (2-1) | 35% |
| 3-BB(F)B(F,F)XB(F)-F | (3-4-1) | 10% |
| 3-HBBXB(F,F)-F | (3-4-3) | 5% |
| 3-HHB(F)-F | (3-5-5) | 5% |
| 3-HBB(F)-F | (3-5-6) | 10% |
| 3-HBEB(F,F)-F | (3-5-10) | 3% |
| 5-HBEB(F,F)-F | (3-5-10) | 3% |
| 3-BB(F)B(F,F)-F | (3-5-12) | 8% |
| 3-HHB-O1 | (4-2-1-1) | 3% |
| 3-HHEH-3 | (4-2-2-1) | 3% |
| 2-BB(F)B-3 | (4-2-4-1) | 5% |
| 3-HB(F)HH-5 | (4-2-6-1) | 5% |

NI = 92.5° C.;
Tc ≤ -20° C.;
Δn = 0.119;
Δε = 6.1;
η = 16.5 mPa · s;
Vth = 2.19 V.

The compositions in Example 1 to Example 8 have a smaller viscosity in comparison with the compositions in Comparative Example 1 to Comparative Example 3. Therefore, the liquid crystal composition according to the invention has superb characteristics.

INDUSTRIAL APPLICABILITY

The invention concerns a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a large elastic constant, a high stability to ultraviolet light and a high stability to heat, or a liquid crystal composition having a suitable balance regarding at least two of the characteristics. A liquid crystal display device including such a composition is applied to constitute an AM device having a short response time, a large voltage holding ratio, a large contrast ratio, a long service life and so forth, and thus can be used for a liquid crystal projector, a liquid crystal television and so forth.

What is claimed is:

1. A liquid crystal composition that has a nematic phase, and contains at least one compound represented by formula (1) as a first component, at least one compound represented by formula (2) as a second component, and at least one compound represented by formula (3-4-2) as a third component; a ratio of the second component is in the range of more than 44% by weight or equal to 44% by weight but less than 65% by weight or equal to 65% by weight based on the total weight of the liquid crystal composition:

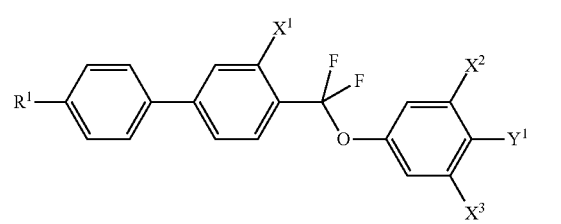

(1)

(2)

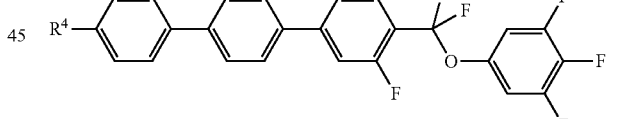

(3-4-2)

wherein, $R^1$ and $R^4$ are independently alkyl having 1 to 12 carbons or alkenyl having 2 to 12 carbons, $R^2$ and $R^3$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $X^1$, $X^2$ and $X^3$ are independently hydrogen or fluorine; $Y^1$ is fluorine, chlorine or trifluoromethoxy, and any one of $R^2$ or $R^3$ is independently alkenyl having 2 to 12 carbons, or alkenyl having 2 to 12 carbons in which arbitrary hydrogen is replaced by fluorine.

2. The liquid crystal composition according to claim 1, wherein the first component is at least one compound selected from the group of compounds represented by formula (1-1) and formula (1-2):

(1-1)

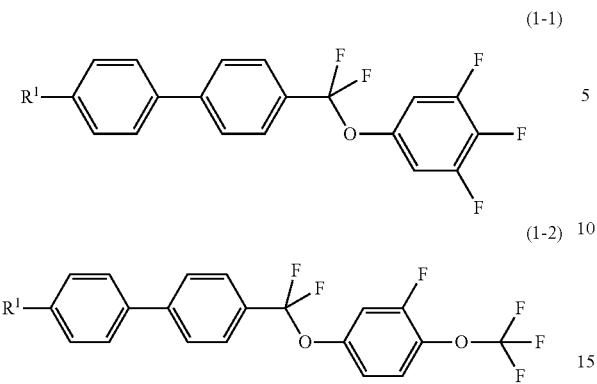

(1-2)

wherein, $R^1$ is alkyl having 1 to 12 carbons or alkenyl having 2 to 12 carbons.

3. The liquid crystal composition according to claim 1, wherein a ratio of the first component is in the range of 3% by weight to 30% by weight, and a ratio of the third component is in the range of 10% by weight to 80% by weight based on the total weight of the liquid crystal composition.

4. The liquid crystal composition according to claim 1, further containing at least one compound selected from the group of compounds represented by formula (4-1) and formula (4-2) as a fourth component:

(4-1)

(4-2)

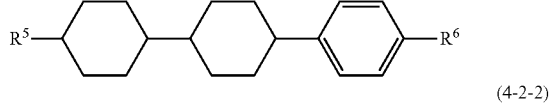

wherein, $R^5$ and $R^6$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring D, ring E and ring F are independently 1,4-cyclohexylene, 1,4-phenylene, 2-fluoro-1,4-phenylene and 3-fluoro-1,4-phenylene;

$Z^2$ is independently a single bond, ethylene or carbonyloxy; and r is 2 or 3.

5. The liquid crystal composition according to claim 4, wherein the fourth component contains at least one compound selected from the group of compounds represented by formula (4-1-1), formula (4-1-2), and formula (4-2-1) to formula (4-2-9):

(4-1-1)

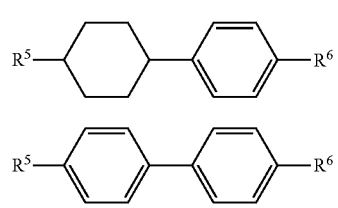

(4-1-2)

(4-2-1)

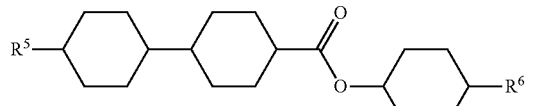

(4-2-2)

(4-2-3)

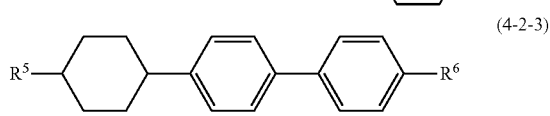

(4-2-4)

(4-2-5)

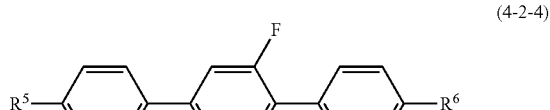

(4-2-6)

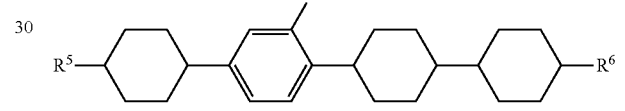

(4-2-7)

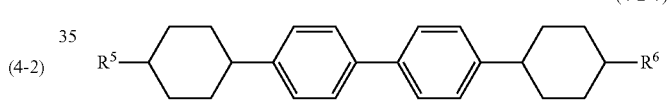

(4-2-8)

(4-2-9)

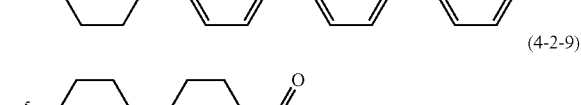

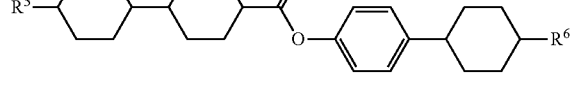

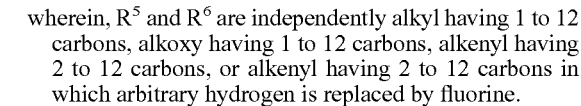

wherein, $R^5$ and $R^6$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

6. The liquid crystal composition according to claim 4, wherein a ratio of the fourth component is in the range of 5% by weight to 60% by weight based on the total weight of the liquid crystal composition.

7. The liquid crystal composition according to claim 1, wherein a maximum temperature of a nematic phase is 70° C. or higher, an optical anisotropy (25° C.) at a wavelength of 589 nanometers is 0.07 or more, and a dielectric anisotropy (25° C.) at a frequency of 1 kHz is 2 or more.

8. A liquid crystal display device including the liquid crystal composition according to claim 1.

9. The liquid crystal display device according to claim 8, wherein an operating mode of the liquid crystal display device is a TN mode, an ECB mode, an OCB mode, an IPS mode or a PSA mode, and a driving mode of the liquid crystal display device is an active matrix mode.

* * * * *